United States Patent
Bonetti

(10) Patent No.: US 9,115,499 B2
(45) Date of Patent: Aug. 25, 2015

(54) VERTICAL STAIR

(75) Inventor: Umberto Ernesto Bonetti, Bevagna (IT)

(73) Assignee: ESPERIRE S.R.L., Torre del Colle, Bevagna (PG) (IT)

( * ) Notice: Subject to any disclaimer, the term of this patent is extended or adjusted under 35 U.S.C. 154(b) by 0 days.

(21) Appl. No.: 13/885,962

(22) PCT Filed: Nov. 18, 2011

(86) PCT No.: PCT/IB2011/002731
§ 371 (c)(1),
(2), (4) Date: Aug. 7, 2013

(87) PCT Pub. No.: WO2012/066411
PCT Pub. Date: May 24, 2012

(65) Prior Publication Data
US 2013/0313041 A1   Nov. 28, 2013

(30) Foreign Application Priority Data

Nov. 19, 2010   (IT) .......................... PG2010U000030

(51) Int. Cl.
*E04F 11/02* (2006.01)
*A62B 1/00* (2006.01)
*E06C 9/04* (2006.01)
*B66B 9/00* (2006.01)

(52) U.S. Cl.
CPC ............... *E04F 11/0201* (2013.01); *A62B 1/00* (2013.01); *B66B 9/00* (2013.01); *E06C 9/04* (2013.01); *B29C 2791/006* (2013.01); *B29C 2791/007* (2013.01)

(58) Field of Classification Search
CPC .................................. A01D 46/20; A62B 1/00
See application file for complete search history.

(56) References Cited

U.S. PATENT DOCUMENTS

| | | | | |
|---|---|---|---|---|
| 952,720 | A * | 3/1910 | Allen | 182/135 |
| 1,458,881 | A * | 6/1923 | Gromer | 104/28 |
| 1,585,925 | A | 5/1926 | Laborda | |
| 3,075,612 | A * | 1/1963 | Gould | 182/196 |
| 4,310,070 | A * | 1/1982 | Mastrogiannis | 182/134 |
| 5,584,364 | A * | 12/1996 | Sakita | 187/249 |
| 6,336,523 | B1 * | 1/2002 | Ozeki et al. | 187/391 |
| 6,598,709 | B2 * | 7/2003 | Bammert | 187/306 |

(Continued)

FOREIGN PATENT DOCUMENTS

| | | |
|---|---|---|
| DE | 20 2004 004117 | 5/2004 |
| EP | 1 319 796 | 6/2003 |

(Continued)

OTHER PUBLICATIONS

International Search Report for International Application No. PCT/IB2011/002731 mailed Mar. 26, 2012 (3 pages).

*Primary Examiner* — Alvin Chin-Shue
(74) *Attorney, Agent, or Firm* — Merchant & Gould P.C.

(57) ABSTRACT

Vertical stairs include a bearing structure 2, which is arranged between a first station "A" and at least one second station "B", and at least one board 3, which can slide by at least one slide 31 along at least one guide 41 in a mechanical system 4, adapted to move the at least one board 3 along the guide 41. The mechanical system 4 allows the at least one board 3 to be moved along a vertical axis "Z" as a function of the distribution of the weight of at least one user "U" on at least one portion of the at least one board 3, and as a function of the direction in which the user "U" wants to move along the vertical axis "Z" between the stations.

9 Claims, 3 Drawing Sheets

(56) References Cited

U.S. PATENT DOCUMENTS

| | | |
|---|---|---|
| 7,798,288 B2 | 9/2010 | Blasek |
| 8,141,681 B2 * | 3/2012 | Brickell et al. ................. 182/37 |
| 2004/0007428 A1 * | 1/2004 | Teramoto et al. ............. 187/249 |
| 2007/0189883 A1 * | 8/2007 | Maurer et al. ................. 414/373 |
| 2007/0267250 A1 * | 11/2007 | Wolff ........................... 182/103 |

FOREIGN PATENT DOCUMENTS

| | | |
|---|---|---|
| EP | 1 506 799 | 2/2005 |
| EP | 1787937 A2 * | 5/2007 |
| NL | 1 033 020 | 6/2008 |
| WO | WO 2004/079126 | 9/2004 |

* cited by examiner

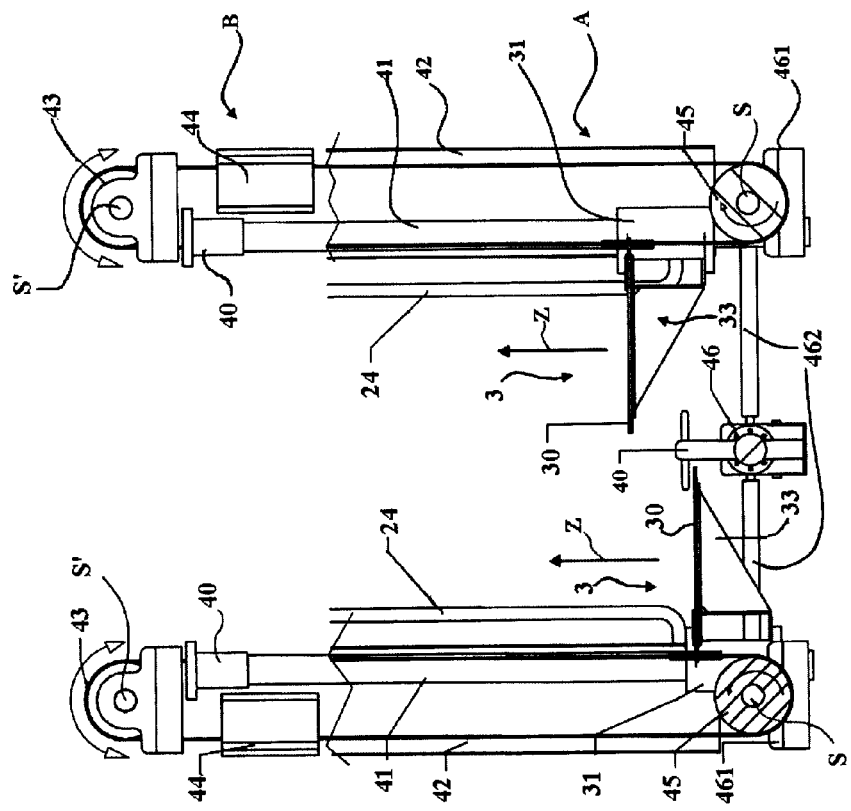
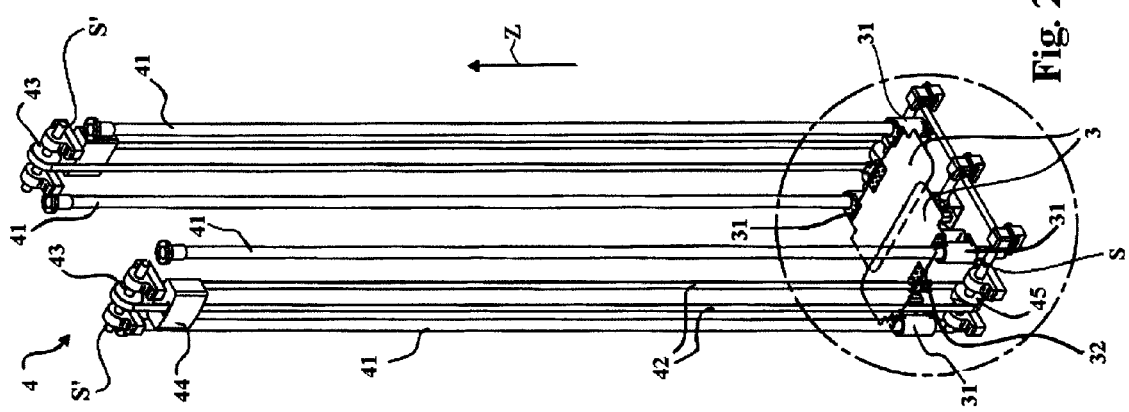

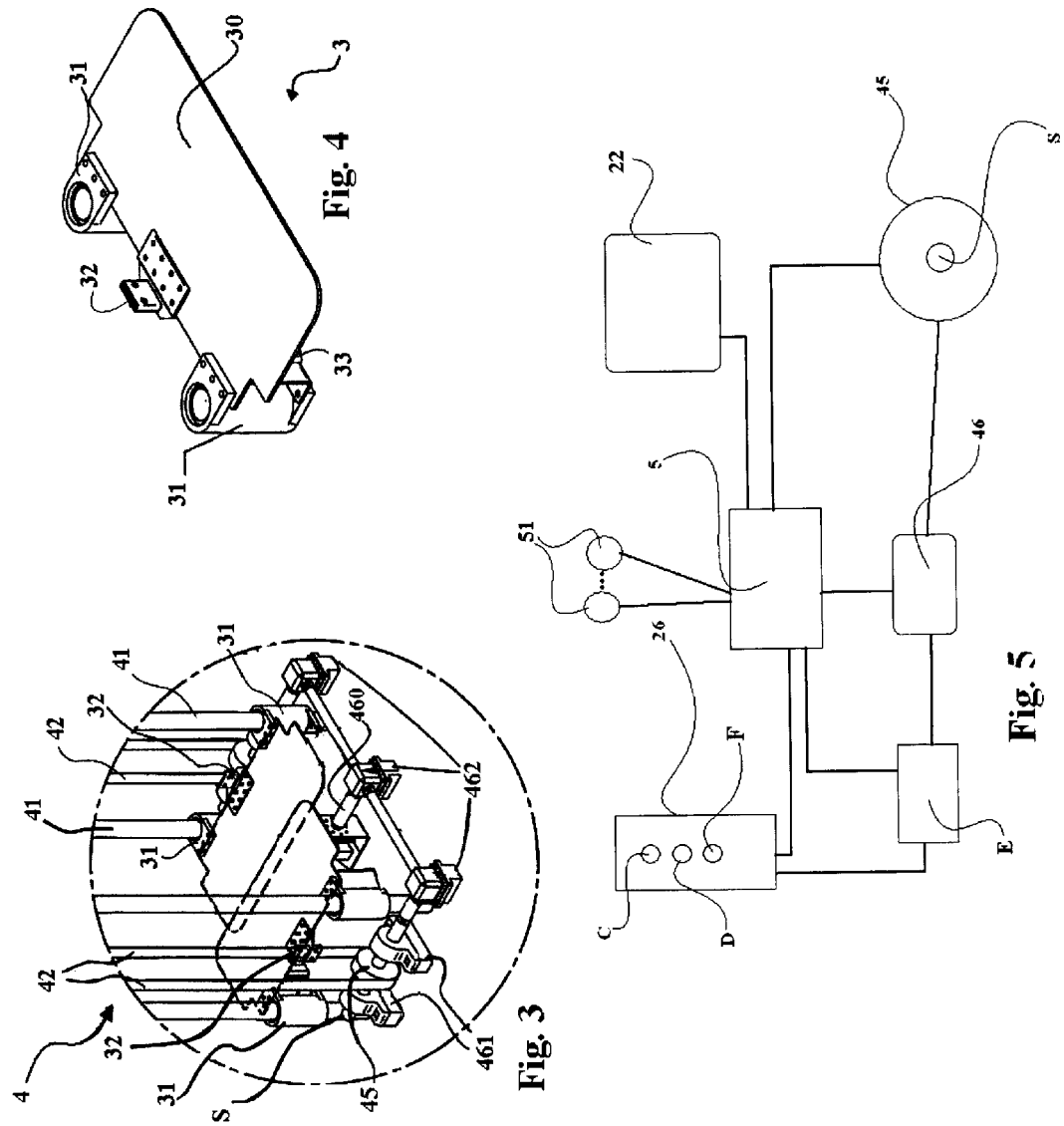

VERTICAL STAIR

The present invention is relative to dynamic vertical stairs, which allow the user to move along a vertical axis "Z" recovering, at least partially, the energy used for performing this movement.

Stairs are known, which allow the user to perform a movement substantially along a vertical axis "Z", such as, for example, ladders.

In the technical field of buildings, the passage from one floor to the other is accomplished by means of stairs comprising a plurality of substantially horizontal structures, called steps, which are arranged at different heights, so that user can put the foot on one of the steps without being hindered by the neighboring steps.

The slope or pitch of the stairs is defined as a function of the dimensions of steps, of the different heights and of the different distances. Normally, stairs with a pitch ranging from 75° to 90° are defined as manual stairs, since they require, besides the use of feet, also the use of hands in order to guarantee the safety of the user while proceeding along these stairs, thus avoiding accidents.

In houses, the slope of the stairs for the connection between adjacent floors ranges from 24° to 45°. Therefore, in order to cover a difference in height between floors, a longitudinal extension of the stairs is necessary, which is at least equal to the vertical difference in height.

Furthermore, stairs are known, which, in order to reduce the longitudinal space occupied, follow a substantially spiral path, like for example the stairs present in the lobbies of the buildings, but at the same time, on the other hand, increase the transverse extension of the stairs themselves and, thus, need a very complex structure, which is suited to support said stairs.

Furthermore, spiral stairs are known, which have reduced dimensions both from a longitudinal and from a transverse point a view and, in order to do so, use reduced curvature angles. Though, these stairs are not very practical and, moreover, they are not safe for the user. Indeed, this type of stairs does not allow the displacement of bulky objects from one floor to the other, since the space available for the movement is very reduced.

Devices are also known, which are suited to perform a movement along a vertical axis, such as for example elevators. Said elevators, though, turn out to be very expensive and take up much space, thus making it difficult for them to be installed in houses with small dimensions. Elevators, indeed, need very powerful actuators in order to transfer a cage, which can house different users, between different floors.

Furthermore, the use of elevators requires the observation of very strict rules, which can be hardly followed by a common user in his/her own house.

The object of the present invention is to solve the above-mentioned problems by providing dynamic vertical stairs comprising a mechanical system, which is suited to allow the user to move along a vertical axis. Said mechanical system can at least partially recover energy during said movements along the vertical axis. The energy recovered can be used to guarantee the operation of the devices comprised in the vertical stairs.

One aspect of the present invention regards vertical stairs having the features set forth in appended independent claim 1.

Further accessory features are set forth in the appended dependent claims.

The additional features and advantages of said vertical stairs will be best understood in the following detailed description of at least one embodiment with reference to the accompanying drawings, which respectively illustrate:

FIGS. 1A, 1B illustrate the vertical stairs according to the present invention in the two stations; FIG. 1A illustrates the stairs in a lower station; FIG. 1B illustrates the stars in an upper station;

FIGS. 2A, 2B illustrate, in different views, an embodiment of the mechanical system comprised in said stairs; FIG. 2A illustrates the mechanical system in a prospective view; FIG. 2B illustrates the mechanical system in a front view in section;

FIG. 3 illustrates, in detail, the connection portion of the mechanical system with the boards of FIG. 2A;

FIG. 4 illustrates a board comprised in the mechanical system of the preceding figures;

FIG. 5 illustrates the flowchart of the control device comprised in the stairs according to the present invention.

Figure 1A:
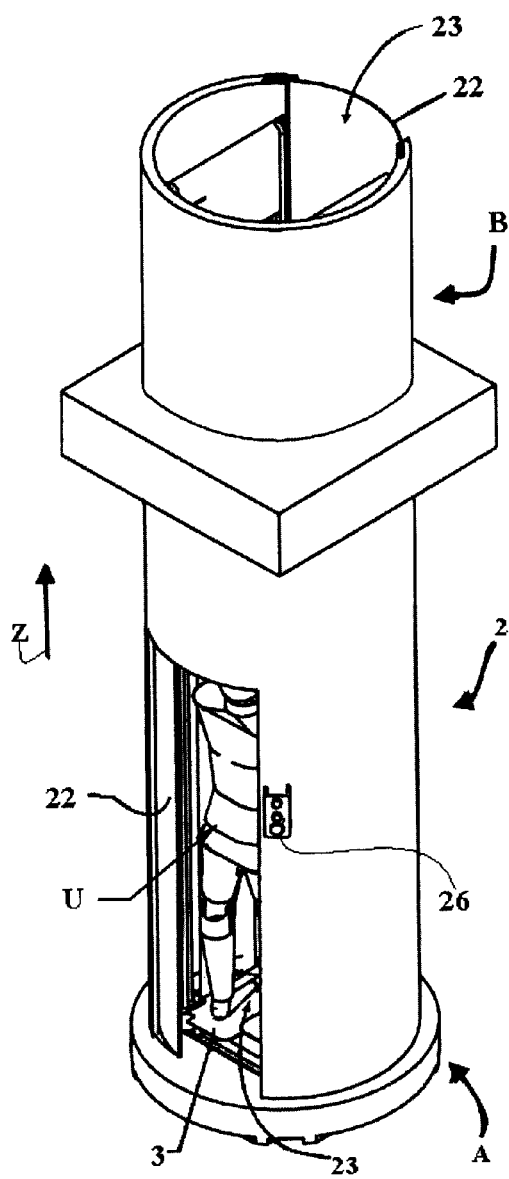

With reference to the above-mentioned figures, the vertical stairs comprise a bearing structure 2, which is arranged between a first station "A" and at least one second station "B", and at least one board 3, which can slide by means of at least one slide 31 along at least one guide 41 comprised in a mechanical system 4, adapted to move said at least one board 3 along said guide 41.

Said mechanical system 4 allows said at least one board 3 to be moved along a vertical axis "Z" as a function of the distribution of the weight of at least one user "U" on at least one portion of said at least one board 3, and as a function of the direction in which said user "U" wants to move along said vertical axis between said stations, for example between a first station "A" and said at least one second station "B" and vice versa.

Said bearing structure 2, which is suited to support the entire structure of the stairs, comprises an external body, which preferably has a circular shape or other shapes as a function of the needs of the buyer. Furthermore, said external body of bearing structure 2 forms a space 23, adapted to house at least one user "U".

Said mechanical system 4 is preferably arranged so as to be at least partially hidden to the user inside bearing structure 2.

Preferably, said mechanical system is at least partially arranged in correspondence to said first station "A", preferably underneath the ground.

According to the present invention, first station "A" is arranged at a lower height of vertical axis "Z" with respect to said at least one second station "B". An embodiment of the stairs, which is not illustrated, comprises a plurality of stations "B".

Said bearing structure 2 comprises at least one door 22, preferably opened by hand, for example sliding, which is arranged in correspondence to each one of said stations (A, B) and adapted to allow the user "U" to access said space 23.

Said doors 22 are preferably interlocked; furthermore, said doors 22 comprise at least one safety microswitch and at least one audible warning device, which are not illustrated and are connected to control device 5. Said microswitch is suited to detect the correct closing of door 22. Said audible warning device is activated by control device 5 in case said microswitch detects a wrong closing of door 22, thus warning the user of the fact that the door was not correctly closed. As a consequence, said control device 5 is also suited to detect the correct closing of doors 22.

Figure 1B:
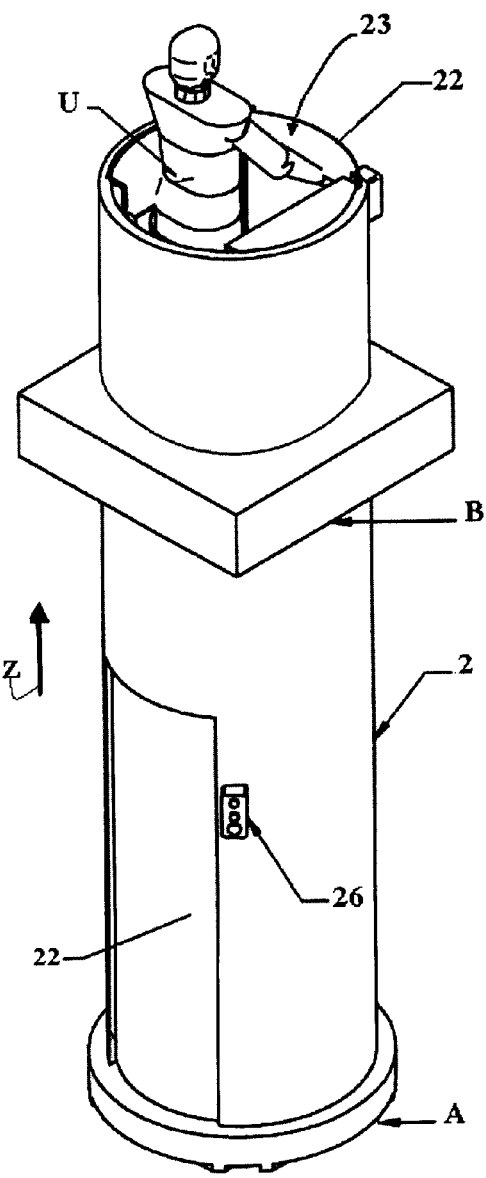

In the embodiment illustrated in FIGS. 1A and 1B there are two doors 22, which are arranged in correspondence to each station (A, B), adapted to allow the access of user "U" to space 23 and to close user "U" inside space 23 during the different operating configurations, so as to avoid accidents.

Said at least one board 3 comprises, furthermore: an anti-slip sheet 30, for example an embossed sheet; said at least one slide 31, which is connected to said board 3, for example, by means of a flange; fixing means 32 for fixing said board 3 to a traction means 42, for example a belt or a chain; and least one reinforcement 33, adapted to keep said board 3 horizontal and to support the weight of user "U".

Mechanical system 4 comprises: at least one guide 41 comprising at least one column, preferably circular pipes; said at least one traction means 42; at least one countershaft 43, adapted to allow the movement of said traction means 42; at least one counterweight 44, which is connected to said traction means 42 and adapted to counterbalance the weight of user "U", which rests on at least one portion of said at least one board 3; at least one controlled wheel 45, adapted to recover electrical 3 energy or to assist the movement of said at least one board during the different operating configurations; and at least one control device 5, adapted to control the devices comprised in the stairs according to the present invention. Said at least one generator 46 is preferably a separately excited DC motor.

In the embodiment illustrated in FIGS. 2A and 2B, mechanical system 4 comprises two mirror-like structures, each of which is associated to a board 3 on which user "U" respectively puts his feet and is adapted to allow the movement of relative board 3. Furthermore, each controlled wheel 45, for example a pinion, is controlled by said control device 5. Said device, in predetermined operating configurations, allows said wheel 45 to rotate in one single rotation direction, thus preventing control wheel 45 itself from rotating in the opposite rotation direction. After an appropriate command has been given, said control device 5 allows controlled wheel 45 to rotate in both directions.

For each structure of mechanical system 4, at least one traction means 42 is arranged on said wheel 45. Said traction means 42 generates a closed path between said fixed wheel 45 and said countershaft 43, preferably a freewheel, which is splined to a first shaft "S'" by means of at least one rolling bearing. Preferably, said controlled wheel 45 is arranged close to said first station "A" and said countershaft 43 is arranged close to one of said second stations "B", preferably in correspondence to the last upper station.

Each controlled wheel 45 is splined to a second shaft "S" and is supported by means supports 461 which comprise rolling bearings. Generator 46 is connected to said second shaft "S" by means of transmission means.

Said at least one generator 46, in predetermined operating configurations, is adapted to generate electric current from the rotation of said controlled wheel 45; while, in other predetermined operating configurations, said at least one generator 46 is an actuator, which allows said at least one board 3 to be moved between one station and the other, when user "U" needs to use the present stairs.

Preferably, each controlled wheel 45 comprised in one of the mirror-like structures of mechanical system 4 is connected to a single generator 46 by means of said transmission means. In particular, said transmission means comprise a transmission shaft 460 and transmission elements 462, adapted to provide a "T"-shaped transmission, so as to connect controlled wheels 45 to generator 46, as shown, for example, in FIGS. 2A and 3.

The vertical stairs according to the present invention comprise the following operating configurations:
upward configuration, in which mechanical system 4 is configured to allow said at least one board 3 to move from a lower station to an upper station;
downward configuration, in which mechanical system 4 is configured to allow said at least one board 3 to move from an upper station to a lower station;
recall configuration, in which mechanical system 4 is configured to move said at least one board 3 towards a desired station.

Within the scope of the present invention, the term "lower station" and "upper station" indicate two stations, which are respectively arranged, with respect to axis "Z", one below the other and vice versa.

In the upward operating configuration, control device 5 allows controlled wheel 45 to rotate in one single direction, thus allowing boards 3 to move from a lower station to an upper station. The movement of the boards from a lower station, for example station "A", to an upper station, for example station "B", takes place thanks to said counterweight 44, adapted to lift said boards 3. The accidental upward movement of said boards 3 is hindered by the weight of user "U" himself/herself.

The two boards 3 are preferably constrained to each other, for example by means of a belt, which is preferably made of rubber or cloth, or by means of at least one bracket, which is made, for example, of metal or plastic, so to prevent a maximum difference in height between the two boards from being exceeded, in order to guarantee the safety of user "U". User "U" is free to choose the difference in height between the two boards 3 with every step he/she takes. In the downward operating configuration, in which controlled wheel 45 rotates in an opposite direction with respect to the rotation allowed in the upward configuration, said controlled wheel 45 is preferably not controlled any longer by control device 5; furthermore, generator 46 acts as a dynamo, thus producing electrical energy. In this operating configuration, boards 3 move from an upper station to a lower station thanks to the weight of user "U".

In the present operating configuration, said generator 46, which is connected to said controlled wheel 45 by means of transmission means, is adapted to recover electrical energy from the rotation of controlled wheel 45, thus storing it in at least one battery pack "E".

Furthermore, generator 46, which, in turn, is controlled by control device 5, controls the downward movement of boards 3, for example by keeping the rpm and, thus, the rotation speed of controlled wheel 45 constant. Said control takes place by means of a plurality of sensors 51, which are, for example, position sensors, load cells, tachometers, etc., and are adapted to detect different parameters that are useful to control the devices comprised in the vertical stairs. The use of said sensors 51 will not be described in detail, since the skilled person knows their working principles.

Said at least one battery pack "E", in which the electrical energy produced by said generator 46 is stored as direct current, comprises at least one battery, which is preferably rechargeable.

Mechanical system 4 comprises a blocking system 40, adapted to block boards 3, which, otherwise, would move again towards the upper stations due to counterweight 44 to which they are connected by means of traction means 42. In a non-limiting embodiment, said blocking device 40 is an electromechanical system, which, after the blocking push-button "F" connected to control device 5 has been pushed, allows the rotation of controlled wheel 45 to be blocked, until the following command is received. In a further non-limiting embodiment, said blocking device 40 is a mechanism adapted to prevent boards 3 from accidentally moving, thus interfering with their movement along axis "Z", for example by hindering the sliding movement of slides 31 along guides 41.

Preferably, in case of two stations, namely a lower station "A" and an upper station "B", blocking device 40 in upper station "B" is a mechanical stop device arranged on said guides 41, adapted to stop said boards 3, once they have reached the upper station "B"; while, in lower station "A", it is a striker element, which is fitted to bearing structure 2 and prevents boards 3 from moving towards upper station "B".

The recall operating configuration allows boards 3 to move, in a controlled way, from an initial station to the desired station, in which user "U" is waiting to use the stairs.

In a first non-limiting embodiment, the recall of boards 3 from a station towards the desired station takes place in a manual manner by means of a recall mechanism, for example a crank, which is connected to both controlled wheels 45. In this embodiment, control device 5, in the recall operating configuration, allows controlled wheel 45 to freely rotate, so that boards 3 can be moved by mean of said recall mechanism, which is not illustrated in detail.

Control device 5, as a function of the station in which user "U" is standing and as a function of the station which said boards 3 had been previously located, allows controlled wheel 45 to rotate in the appropriate direction, so as to allow boards 3 to reach the station requested. Furthermore, control device 5 controls generator 46 in such a way that allows the latter to work as actuator, thus assisting the movement of boards 3 from a starting station to a desired station, causing said controlled wheel 45 to rotate and recalling said boards 3 towards the desired station.

The energy needed by generator 46 to move said boards 3 is obtained from battery pack "E", where the energy produced during the downward operating configuration is stored.

In the upwards operating configuration, user "U" preferably performs the following subsequent steps:
 a) opening the door in correspondence to a lower station;
 b) entering space 23 and closing door 22;
 c) putting one foot on each board 3;
 d) disabling blocking device 40;
 e) lifting a first leg while keeping his/her balance by means of proper handrails 24, thus allowing the first board 3, corresponding to the leg that has been lifted, to move upwards in a vertical direction;
 f) stopping lifting the first leg, when the desired height along the axis "Z" is reached, by shifting the weight of the body to the second board 3;
 g) lifting the second leg, thus allowing the second board 3 to move upwards in a vertical direction;
 h) stopping lifting the second leg by shifting the weight of the body to the first board 3, when the desired height along axis "Z" is reached;
 i) repeating steps e) and h), until the desired upper station is reached;
 j) enabling blocking device 40;
 k) opening door 22 and closing it again behind his/her back.

The step of stopping lifting the leg and of shifting the weight from one board 3 to the other leads to the blocking of the board itself in the current position, since traction means 42, which is connected to said controlled wheel 45, which is electrically blocked, prevents board 3 from moving below the level chosen, since said controlled wheel 45, in the present operating configuration, can rotate only in a direction imposed by control device 5.

The person who uses the system only has to lift, step by step, the lower limbs following the upward movement of boards 3. Indeed, in the upward operating configuration, said boards would tend to continue moving towards to following station "B" thanks to counterweight 44 connected to said traction means 42, to which boards 3 are fixed, as well.

By stopping board 3 with the use of the limbs, the board itself remains in the position chosen, since said controlled wheel 45 prevents traction means 42 from moving boards 3 towards the lower starting station, as already mentioned above.

These step-by-step applications allow the user to move upwards without any physical effort; furthermore, user "U" has to chance to use the aid of the upper limbs by holding at least one of handrails 24 installed in space 23. Said at least one handrail 24 allows user "U" to keep his/her balance during the different operating configurations.

In the downward operating configuration, user "U" performs the following subsequent steps:
 a) opening door 22 in correspondence to an upper station, for example a station "B";
 b) entering space 23 and closing door 22;
 c) pushing a special downward button "D";
 d) waiting for the downward travel of board 3 towards a desired lower station to end;
 e) enabling blocking device 40;
 f) opening the door in correspondence to the desired station and closing it again behind his/her back.

In the downward operating configuration, generator 46 acts as a current generator with the consequent conversion of the mechanical energy generated by the rotation of controlled wheel 45 to electrical energy to be stored in battery pack "E". Said generator 46, which is controlled by said control device 5, rotates at a constant speed with a predetermined rpm, thus controlling the downward speed of boards 3, as already mentioned above.

When door 22, which is provided with a microswitch, is closed, a signal is sent to control device 5, which controls controlled wheels 45 in an electric way, thus allowing them to be released and to rotate, for example, in both directions.

In the recall operating configuration, user "U" performs the following subsequent steps:
 a) pushing a special call button "C";
 b) waiting for said boards 3 to reach the station where button "C" has been pushed;
 c) opening door 22 and entering space 23;
 d) performing the steps of the upward operating configuration or of the downward operating configuration.

In the present configuration, the movement of boards 3 in step b) is carried out by generator 46, which acts as an actuator and, by so doing, moves boards 3. Said generator can use the electrical energy stored in battery pack "E", said energy having been recovered during the downward operating configuration.

Control device 5 is able to determine the position of boards 3 in the moment in which the button "C" is pressed and to properly control generator 46; furthermore, it controls mechanical system 4 and, in particular, controlled wheels 45, so as to allow boards 3 to move towards the station where button "C" has been pushed.

Preferably, said call button "C" is arranged close to doors 22 of all stations (A, B).

All buttons (C, D, F) are located in proper control panels 26. Said control panel 26 is arranged in correspondence to each station (A, B) and inside space 23 of the stairs.

Preferably, said control panel 26 also comprises further buttons or electric devices that are useful for the use of the vertical stairs.

For safety reasons, the control device actuates the above-mentioned recall operating configuration only if all doors 22 have been correctly closed.

Similarly, control device 5 allows the actuation of the upward and downward operating configurations only if all doors 22 have been correctly closed after user "U" has entered space 23.

Furthermore, in an alternative embodiment of the stairs according to the present invention, the different electronic and electromechanical devices are directly connected to the electric power distribution mains. Said stairs comprise, anyway, at least one safety battery pack "E". In this embodiment, electric power is directly supplied to all the electronic/electromechanical devices by means of the mains. Said battery pack "E" is necessary to guarantee the actuation of the operating conditions in case of a temporary failure of the mains. In this embodiment, mechanical system 4 can possibly be provided with an electromechanical braking clutch for controlling the downward movement of boards 3, since generator 46 does not need any longer to be used as dynamo for the recovery of energy.

Preferably, control device 5 is arranged in a control unit, for example an electric cabinet, which is not illustrated. Battery pack "E" and the possible electric and electronic circuits necessary for the correct operation of the vertical stairs according to the present invention can also be arranged inside said electric cabinet.

The stairs according to the present invention can be installed inside a private house and/or inside any other type of building that allows people to move from one floor to the other of the building itself.

Said stairs are the ideal solution to replace the traditional spiral stairs in very small rooms, where the conventional flight stairs cannot be used. The device is independent and reduces energy consumption; furthermore, it can be easily applied and installed, thus replacing traditional spiral stairs with greater advantages in terms of convenience and of increase in the net floor area of the house. As a matter of fact, the vertical upward movement towards an upper floor takes place by exploiting the physical unbalance to which the moving boards are subject. Furthermore, the chance to choose, step by step, the difference in height of boards 3 during the upward operating configuration allows the stairs to be comfortably used by able people of every age. The stairs according to the present invention do not need any kind of preliminary study concerning the ratio between the rise height and the tread depth in order to overcome the given difference in height, since they can adapt to any difference in height, even though it is remarkable, guaranteeing at the same time the same planimetric space occupied on the floor.

The mechanical system comprised in the vertical stairs according to the present invention, being provided with a generator 46 able to act as a dynamo, can store the electrical energy recovered during the downward operating configuration and, furthermore, guarantees the safety of said operating configuration. Said energy, which is stored in battery packs "E", can be used to recall the boards and to supply control device 5, which controls the microswitches of the doors and the control panel provided with warning lights and push-buttons for the operation of the stairs.

The stairs according to the present invention are preferably offered on the market in three different embodiments:
  Basic version, without external body of bearing structure 2, in which every operating configuration is completely manual, for example with mechanical recall of boards 3 by means of traction means such as chains or belts, with no electric power supply;
  Standard version, comprising a round or square body, with electromechanical recall of boards 3 and independent electric power supply by means of battery packs "E" with energy recovery;
  Deluxe version, with design body, electric recall of boards 3 and, as optional extra, electric power supply of mechanical system 4 and of the electronic and electromechanical devices by means of the energy distribution mains.

The invention claimed is:

1. Vertical stairs comprising:
   a bearing construction comprising an external body forming a space adapted to house at least one user, said bearing construction is arranged between a first station and at least one second station,
   two boards, each of said boards being slidable by at least one slide along at least one guide in a mechanical system;
   wherein said mechanical system comprises at least one control device and two structures, each of said structures providing for one of said boards to be moved along a vertical axis as a function of the distribution of weight of at least one user on at least one portion of said one of said boards, and as a function of a direction in which said user wants to move along said vertical axis between said stations;
   each of said structures comprising:
     said at least one guide comprising at least one column;
     a traction means connected to said one of said boards;
     at least one countershaft, adapted to allow said traction means to move;
     at least one counterweight, which is connected to said traction means and adapted to lift one of said boards;
     at least one controlled wheel adapted to recover electric energy or to assist movement of the one of said boards in different operating configurations;
     said tractions means are arranged on the control wheel, and said traction means being adapted to generate a closed path between a fixed wheel and said countershaft, the countershaft being splined to a first shaft and being supported by rolling bearings;
     said controlled wheel is splined to a second shaft, the controlled wheel being supported by rolling bearings;
     said controlled wheel is controlled by said control device allowing the control wheel to rotate in a predetermined direction as a function of the operating configuration;
     said two structures being arranged symmetrically and said two boards being placed between said two structures.

2. Vertical stairs according to claim 1, wherein said mechanical system further comprises:
   at least one generator, which is connected to said at least one controlled wheel.

3. The stairs according to claim 1, wherein the stairs comprise the following operating configurations:
   an upward configuration, in which the mechanical system is configured to allow said at least one board to move from a lower station to an upper station;
   a downward configuration, in which the mechanical system is configured to allow said at least one board to move from an upper station to a lower station;
   a recall configuration, in which the mechanical system is configured to move said at least one board from a first one of the stations towards another station.

4. The stairs according to claim 3, wherein at least one generator, which is connected to said at least one controlled wheel by transmission means, is adapted to recover electrical energy from rotation of the controlled wheel in the downward operating configuration, storing said energy in at least one battery pack.

5. The stairs according to claim 4, wherein said generator, which is connected to said controlled wheel by transmission means, is adapted to assist the movement of the boards from a starting station of said upper station or said lower station to another station of said upper station or said lower station, in the recall operating configuration.

6. The stairs according to claim 3, wherein the recall operating configuration is manually performed by the user by a recall mechanism.

7. The stairs according to claim 1, wherein the mechanical system comprises a blocking device, adapted to block the boards, which, otherwise, would move again towards the upper stations.

8. The stairs according to claim 1, wherein said bearing construction comprises at least one interlocked and sliding door, which is arranged in correspondence to each station adapted to allow the user to access a space, adapted to house the user during passage from one station to the other.

9. The stairs according to claim 8, wherein said doors comprise at least one safety microswitch and at least one audible warning device, which are connected to the control device, adapted to detect correct closing of the door.

* * * * *